No. 773,705. PATENTED NOV. 1, 1904.
L. D. BENNER.
CORN PLANTER.
APPLICATION FILED FEB. 29, 1904.
NO MODEL. 2 SHEETS—SHEET 1.
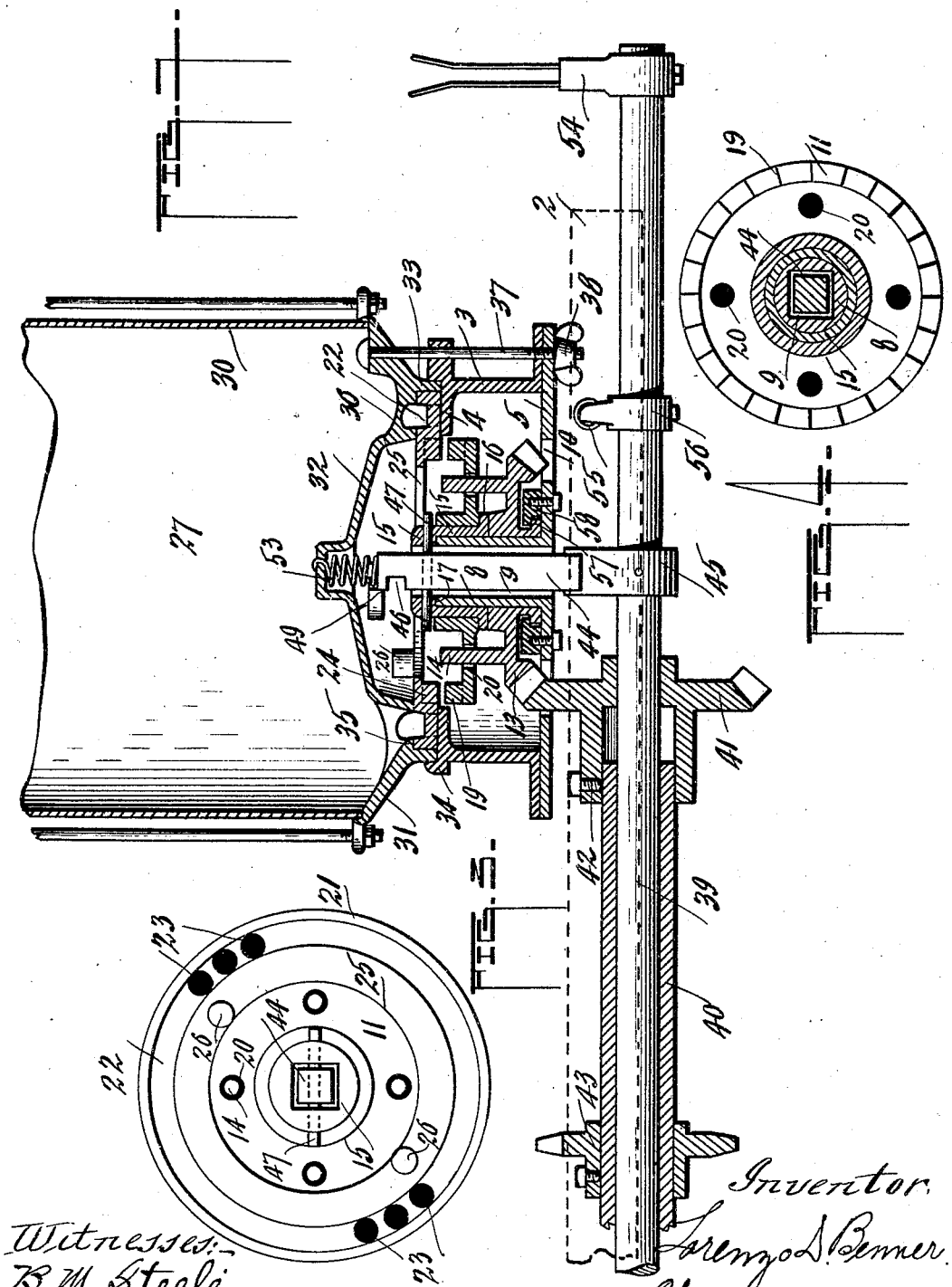

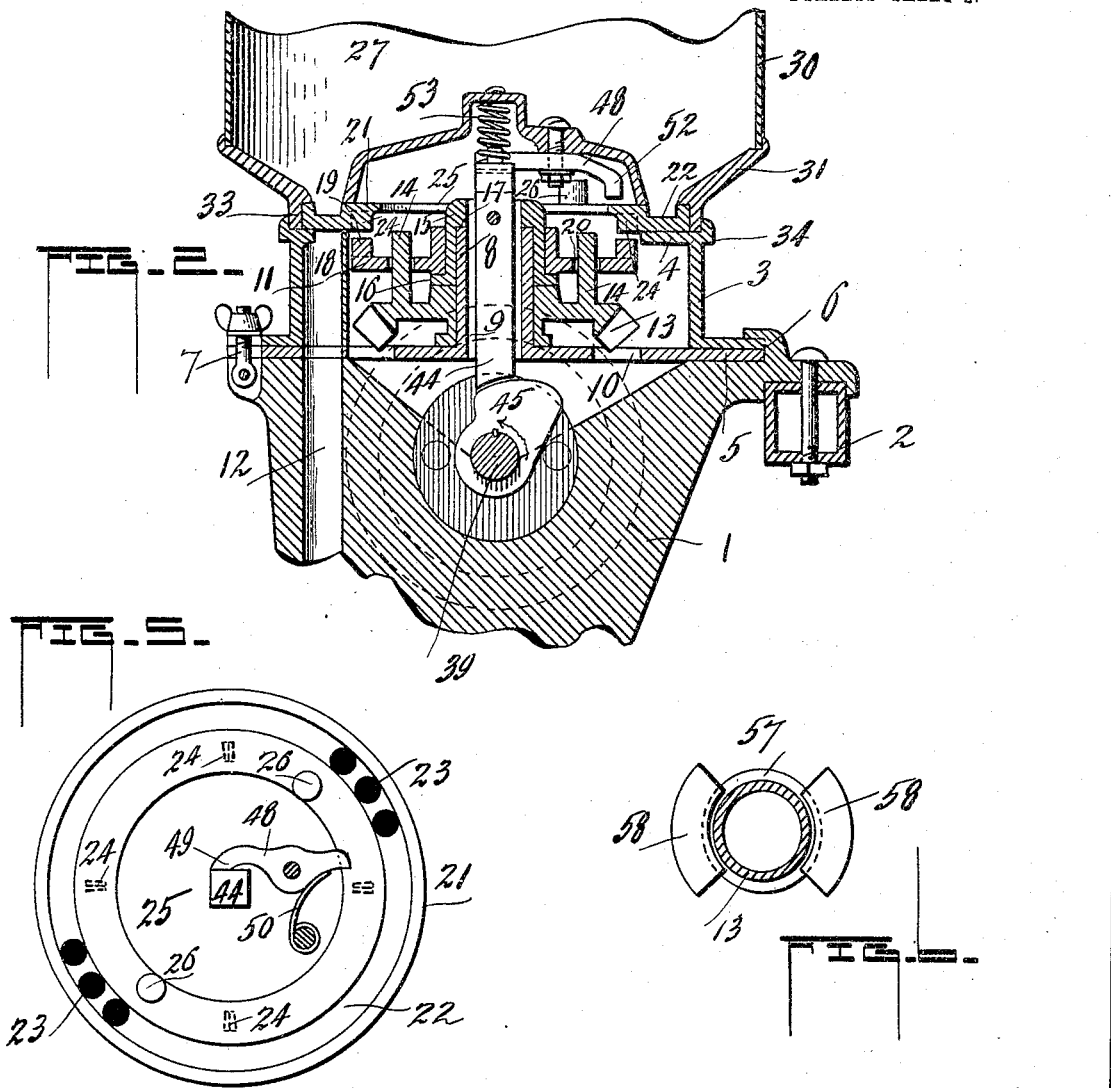

No. 773,705.

Patented November 1, 1904.

UNITED STATES PATENT OFFICE.

LORENZO D. BENNER, OF PEORIA, ILLINOIS, ASSIGNOR TO THE ROCK ISLAND PLOW COMPANY, OF ROCK ISLAND, ILLINOIS, A CORPORATION OF ILLINOIS.

CORN-PLANTER.

SPECIFICATION forming part of Letters Patent No. 773,705, dated November 1, 1904.

Application filed February 29, 1904. Serial No. 195,935. (No model.)

*To all whom it may concern:*

Be it known that I, LORENZO D. BENNER, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

This invention has reference to corn-planters, and has for its object to produce a planter in which is obviated certain objectionable features of that class of planter employing clutch devices for obtaining an intermittent movement of the rotating shaft which transmits power to the seed-plates. This objection is overcome by producing a rotating shaft which is continuously rotated from a driven axle by introducing gearing between said shaft and the seed-plate, the transmission of power from the gearing to the seed-plate being controlled by a plunger or similar member operating through such gearing, the plunger adapted to be actuated by a rock-shaft movable by a tappet-wire by foot or by hand power.

A further object is to simplify the construction and operation of the seeding devices by providing a rock-shaft and a sleeve-shaft revoluble on said rock-shaft, (however, the shafts may be separated, but for convenience in changing the planter to drop at different widths the sleeve-shaft is preferable,) gearing between the sleeve and the seed-plates, a member movable in the gearing for controlling communication between said plate and the gearing, means on the rock-shaft for raising the member to lock the gearing with the plate, and means on the plate for releasing the member, and thereby release the gearing from the plate.

In simplifying the construction of the mechanism and its arrangement beneath the plate for actuating said plate I have so disposed the parts that it is necessary to raise the plunger to actuate the plate. Planting in hills, the plunger is intermittingly raised, giving a corresponding rotation to the plate. If drilling, the plunger would be raised and so held. The plate and connections above the same cooperating therewith controls its point of stopping, which is accomplished by causing the plunger to drop.

That my invention may be more fully understood reference is had to the accompanying drawings, in which—

Figure 1 is a vertical sectional view through a hopper and the seeding mechanism therein, also showing the tappet-arm shaft and the sleeve thereon from which rotation is imparted to the seeding-plate in the hopper. Fig. 2 is a vertical sectional view of a hopper and the seeding devices, being at right angles to that shown in Fig. 1, in addition showing a portion of a shank. Fig. 3 is a plan view of a seeding-plate and parts operating through the center of said plate. Fig. 4 is a plan view of a ratchet-wheel, parts of the same being in section, also showing in section parts which coöperate with the ratchet. Fig. 5 is a plan view of the seed-plate, a plunger operating through the center thereof, and means which is supported by the cap-plate and coöperates with the plunger. Fig. 6 is a detail in plan, showing a portion of a driven bevel-wheel carried in the hopper or its base and the means for retaining the same in position.

In this present invention I wish to make it plain that no attempt has been made to show any invention in the manner of supporting the seedboxes, in which are arranged certain seeding devices, nor is any valve mechanism shown operating within the shanks to control the seed deposited therein through the action of the seed-plate, nor is there shown or described any cut-off or knocker mechanism coöperating with the seed-plate, as these devices are to a more or less extent well known in this art and are employed in like devices and will be in this. The seedboxes are supported upon shanks which are attached to a suitable frame and are arranged at the opposite sides thereof, as in machines of this class, and while a complete frame, shanks, and other features which are ordinarily employed, but here not shown, it is to be understood that the invention is designed and is applicable to various styles of corn-planters.

In the drawings, 1 indicates a shank which may be of suitable form, its forward upper portion being connected to a frame part 2.

3 indicates the false bottom of a seedbox or hopper having the annular ring portion or ledge 4. The base of the false bottom rests upon a plate 5 and, together with said plate, has an interlocking connection at 6 with the upper portion of the shank, and the plate and false bottom are locked to the rear portion of said shank by means of the thumb-nut and pivoted bolt 7, as shown in Fig. 2. The plate 5 has the vertically-extended tubular portion 8, which is provided with the central longitudinal squared opening 9, the plate being further provided with the annular cut-out portion 10 for a purpose to be described and further provided with the tubular portion 11, communicating with the seed-cells in a plate to be described for the purpose of conveying seed discharged by the plate down into the channel 12, arranged in the shank 1.

13 indicates a bevel-wheel journaled on the stem 8 of the plate 5, which serves as a bearing for said gear-wheel, and extending up from the upper face of said wheel is shown the stems or lugs 14, of which there is a series and arranged for the purposes which will soon become apparent. Encircling the upper portion of the stem 8 is shown a sleeve 15, the base of which rests upon the hub of the wheel 13 and is provided with the annular flange portion 16, the upper inner out to form an offset 17, which rests upon the upper edge of the member 8 when said sleeve is in its lowermost position, and encircling the sleeve 15 is a ratchet-wheel 18, the same being rotatably mounted upon said sleeve and whose hub portion is designed to rest upon the flange 16 of the sleeve 15. The ratchet-wheel 18 is provided with the ratchet-teeth 19 upon its upper face, and in the body of said ratchet-wheel is provided a series of holes 20, through which extends the stems 14 of the bevel-wheel.

21 indicates a plate, and in this instance the plate is provided with an annular channel feedway 22, in which is arranged a series of sets of seed-cells, (denoted as 23.) The seed-plate 21 is rotatably supported upon the flange or ledge 4 of the false bottom 3, and on the under side of the plate is provided a series of depending lugs 24, which are adapted to coact with the ratchets of the wheel 18 at predetermined intervals, the purpose of which will soon become apparent. The seed-plate is further provided with the open annular way 25 and with the vertically-extended studs or pins 26, attached to or formed integral with the body of said plate. It may be desirable to employ rollers in the place of the studs or pins 26, and I do not wish to be confined to any specific structure.

The seed-hopper is indicated as 27 and may be of any suitable form; but for convenience I have shown the cylindrical casing 30, supported at its lower end on the annular ring 31, which is attached to or may form a part of a cap-plate 32, the same having the depending annular flange portion 33, which rests upon the flange 4 of the false bottom and lies between the peripheral face of the seed-plate and a vertically-extended flange portion 34 of the false bottom, the ring 31 being provided with a shed 35, overlying the upper outer edge of the seed-plate, as shown in the drawings, and connecting the ring 31 with the body of the cap-plate 32 is shown the webs 36. The manner of locking the ring of the cap-plate with the plate 5 and the false bottom 3 may be by the bolt 37 and the thumb-nut 38, as shown in Fig. 1 of the drawings, or by some other means which would serve the purpose equally as well.

39 indicates a rock-shaft extending from one side of the planter to the other and is suitably journaled in bearings formed in the planter-shanks 1. On this shaft is revolubly carried a sleeve 40, and on the opposite end of said shaft are carried the bevel gear-wheels 41, adapted to be longitudinally adjustable thereon and affixed thereto by means of a set-screw 42, the said bevel gear-wheels extending up through the plates 5 and meshing with the bevel gear-wheels 13. It will be seen that any movement imparted to the sleeve 40 will be correspondingly imparted through its gears 41 to the gears 13. It is adapted to have the sleeve 40 continuously rotated, which also means that the bevel gear-wheels 13 and the ratchet-wheels 18 by reason of the stud connection 14 of the gears 13 with said ratchets will be continuously rotated. On the sleeve 40 is shown a sprocket-wheel 43, adapted to be affixed thereto and to receive its power from the axle of the planter. By continuously rotating the sleeve 40 I am enabled to avoid or obviate the use of clutch mechanism which is usually employed where the driving-shaft is intermittingly actuated and the sprocket continuously driven.

Extending up through the stem 8 is a plunger 44, which is of polygon shape, but may be of any other contour, if so desired. When in its normal position, the lower end of the plunger is extended below the bottom edge of the plate 5 and rests upon a cam 45, which is secured on the rock-shaft 39. The upper end of said plunger extends up above the upper edge of the sleeve 15, and in one of its faces is provided a slot 46. When the plunger 44 is actuated by the cam in a manner to be described, it is intended that the sleeve 15 and the ratchet-wheel 18 will move up or down simultaneously with the movement of the plunger. I accomplish this by passing a pin 47 through the upper end of the sleeve 15 and through the plunger, as seen in the drawings. This is a simple and convenient manner of locking the sleeve to the plunger; but any other suitable connection may be substituted. Pivoted for oscillation to and within the cap-plate 32 is a pawl 48, having the portion 49, which may be caused to enter the slot 46 of the plunger when the same is raised for the purpose of retaining it in such raised position. A spring 50 is provided for the purpose of holding that portion 49 of the pawl against the face of the plunger and for the purpose of returning it to such a position after the same has been oscillated for the purpose of releasing the portion 49 from the slot in the plunger, which is accomplished by the lugs, pins, or rollers 26, attached to the upper face of the plate in the manner shown, which during the rotation of said plate are caused to intermittingly engage with the depending finger portion 52 of the pawl 48, which normally lie in the path of travel of the said pins or rollers 26, a spring 53 bearing between the central body part of the cap-plate and the upper end of the plunger to insure that the plunger will drop to its lower normal position after the pawl 48 has been released from the slot in said plunger.

It will be seen from an examination of the drawings that while the sleeve 40 and the gearing 41 and 13 are continuously rotated the plate is intermittingly actuated and is controlled by the action of the plunger and that the plate itself provided for its stopping after a number of seed-cells have passed over the opening 11 leading to the shank. It is intended that the rock-shaft be actuated by a suitable tappet-wire, (not shown,) which is adapted to engage the tappet-arm 54, secured to the ends of the rock-shaft 39; but it is to be understood and while certain devices are not shown it is intended that the rock-shaft may be actuated by hand or foot power, if desired. After the actuation of said rock-shaft to return it to its normal position I have provided the spring 55, secured at one end to the bar 2 and at its opposite end to the arm 56, attached to said shaft.

When the rock-shaft 39 is actuated, the cam 45 will be caused to move in the direction of the arrow, as shown in Fig. 2, and its cam-surface engaging with the lower end of the plunger 44 will cause the same to be raised. At this instant the rock-shaft 39, through the spring 55 or some equivalent device, will cause said rock-shaft to be returned to its first position, and simultaneous with such movement, or when the plunger 44 has reached its extreme upward movement, it will be locked in such position by reason of the pawl 48, which is forced into the slot 46 by means of the spring 50. The raising of the plunger by means of the pin 47 will raise the sleeve 15, and with it the ratchet-wheel 18, and the ratchets of said wheel will be caused to engage the lugs 24 on the under side of the plate, and the ratchet, which is being continuously rotated by means of the lugs 14, which form a part of the gear 13 and pass through the openings 20 in the body of said ratchet-wheel, will impart a similar revoluble movement to the plate 21 so long as the plunger is raised. It is intended, however, unless one is drilling with the planter, to cause the pins or rollers 26 of the seed-plate during the rotation of the same to engage with the extension 52 of the pawl 48 and release the pawl from the slot in the plunger, which will permit the plunger to fall to its lowermost position, with its lower end in engagement of the cam-surface of the cam 45, the plunger being assisted in its downward movement by reason of the spring 53, as described. It is to be noted that the stems 14 of the gear-wheel 13 are of sufficient length to permit the ratchet-wheel 18 to be raised and yet not be disconnected from the stems of said bevel-wheel. The bevel-wheel has its hub portion provided with the flange 57, which is engaged by the semicircular securing-plates 58 in a suitable manner, attached to the plate 5. This is for the purpose of retaining the gear 13 always in meshing relation with the gear 41, also to permit the sleeve 15 and the ratchet-wheel 18 to have vertical movement and yet be in operative connection with the gear 13.

If it is desired to employ the planter for the purpose of drilling, it is to be noted that it is only necessary to retain the plunger and its component parts in a raised position, which will impart a continuous rotation to the plate 21, and that by the use of the improvements such as herein enumerated none of the parts of the seed mechanism or planter need be disturbed when the planter is being turned at the end of the field.

It is obvious that various changes may be made and that the usual parts of a complete planter may be added to make a complete and operative planter. It has not been thought necessary to show more than one box nor to show the ground-wheels and the axle, because they form no part of this invention, and I do not wish to be confined to the specific showing made, but to embody all that will come within the scope and spirit of the invention herein.

Having thus fully described my invention, what I claim, and desire to secure by Letters Patent of the United States, is—

1. In combination, a seed-plate, a plunger, gearing, means for actuating the plunger, and means actuated by said plunger for imparting motion from the gearing to the seed-plate.

2. In combination, a seed-plate, a plunger having vertical movement through said plate, means for raising said plunger, gearing, and means in operative connection with the plunger and gearing whereby when the plunger is raised motion will be imparted from the gearing to the seed-plate.

3. In combination, a seed-plate, a member having vertical movement through said plate, means for raising the member, means for locking the member when raised and driving parts controlled by the vertical movement of said member for actuating said seed-plate.

4. In combination, a seed-plate, a plunger vertically movable through said plate, a cam for raising said plunger, means for operating said cam, and means controlled by the action of said plunger for operating said seed-plate.

5. In combination, a continuously-driven shaft, an intermittingly-actuated seed-plate, gearing for rotating said seed-plate from said shaft, a vertically-movable member controlling communication between the shaft and seed-plate, and means for moving said member.

6. In combination, a seed-plate, gearing for rotating said seed-plate, a member reciprocally carried within such gearing, connections between the gearing and member whereby connection between the gearing and seed-plate is governed by the member, and means for moving the member.

7. In combination, a rock-shaft, a seed-plate, a plunger operating through the plate, and adapted to govern the rotation of the seed-plate, means on the rock-shaft for raising the member, means above the seed-plate for holding the member raised, and means operated by the plate during its rotation to release the plunger and thereby stop said plate.

8. In combination, a seed-plate, a rock-shaft, a plunger operating through said plate and controlling the mechanism for rotating the plate, a member on the rock-shaft normally engaging the said plunger, means for rocking said shaft to raise the plunger, and means above the seed-plate operating synchronously with the reverse of the rock-shaft to lock the plunger raised, and means on the plate for releasing said plunger.

9. In combination, a seed-discharging plate, gearing for actuating said plate, a plunger movable through said gearing, a rock-shaft, and means carried thereby for raising said plunger, means for rocking the shaft to raise the plunger and then move away therefrom, and means operating synchronously with the moving away of said shaft to lock the plunger raised, and retain it in such position for a predetermined interval, and devices for releasing the plunger and thereby release the gearing from the seed-plate which is controlled by said plunger.

10. In combination, a seedbox, a seed-plate, gearing arranged beneath the plate, means for actuating said gearing continuously, a member operating through the gearing and adapted to control its connection with the plate, when raised, and to release said gearing when lowered, means for raising the member, means for retaining the member raised for a predetermined period, and means actuated by the rotation of the plate for releasing the member to permit it to drop, substantially as and for the purposes specified.

11. In a planter, a seed-plate, gearing, mechanism adapted to be intermittingly actuated for connecting the plate with said gearing, and means on the plate adapted during the rotation thereof to facilitate in disconnecting the gearing from the plate and thereby stop the rotation of the plate.

12. In a planter, a base having a hollow stem, a plate revolubly supported above the stem, gearing surrounding the stem, means for actuating said gearing, a member movable through the stem, when raised adapted to connect the gearing and plate, and when lowered adapted to disconnect the gearing, and means for moving said member.

13. In a planter, a base-plate, a hollow stem extending up from said plate, a gear-wheel revoluble on said stem, means for actuating said gear-wheel, a seed-plate revolubly mounted above said stem, means encircling the stem and above the bevel-wheel for imparting motion from the bevel-wheel to the plate, and means movable in the stem adapted to control the transmission of power from the bevel-wheel to the plate, substantially in manner and for the purposes specified.

14. In a planter, a base-plate, a hollow stem extending up from said plate, a bevel-gear revoluble on said stem, means for actuating said gear, a seed-plate revolubly mounted above said stem, a ratchet-wheel encircling the stem and connected with the gear, means for raising the ratchet to engage and impart motion to the plate from the gear and means for releasing the ratchet from the plate.

15. In a planter, the combination of a seed-plate, gearing for actuating said plate, means for actuating said gearing, a member having an extended movement up through the plate and adapted to control the transmission of motion from the gearing to the plate, means for raising said member, a pawl pivoted above the plate adapted to engage and hold the member when raised, and means on the plate for releasing the pawl from the member, substantially as and for the purposes set forth.

In testimony whereof I affix my signature in presence of two witnesses.

LORENZO D. BENNER.

Witnesses:
 E. A. HAVENS,
 CHAS. N. LA PORTE.